(12) United States Patent
Hetschel

(10) Patent No.: US 7,434,302 B2
(45) Date of Patent: Oct. 14, 2008

(54) REPLACEMENT DEVICE FOR CLAMPING HEADS COMPRISING A PLURALITY OF CLAMPING JAWS

(75) Inventor: Wilhelm Hetschel, Brackenheim (DE)

(73) Assignee: Hainbuch GmbH Spannende Technik (DE)

( * ) Notice: Subject to any disclaimer, the term of this patent is extended or adjusted under 35 U.S.C. 154(b) by 0 days.

(21) Appl. No.: 11/716,177

(22) Filed: Mar. 9, 2007

(65) Prior Publication Data
US 2007/0187966 A1   Aug. 16, 2007

Related U.S. Application Data

(63) Continuation of application No. PCT/EP2005/009744, filed on Sep. 10, 2005.

(30) Foreign Application Priority Data
Sep. 10, 2004   (DE)   ........................ 10 2004 044 848

(51) Int. Cl.
B23P 19/04   (2006.01)
(52) U.S. Cl. ............................. 29/268; 29/255; 29/270
(58) Field of Classification Search .................... 29/268, 29/255, 270, 278
See application file for complete search history.

(56) References Cited

U.S. PATENT DOCUMENTS

| 4,007,535 A * | 2/1977 | Brandt et al. ................. 29/261 |
|---|---|---|
| 4,768,269 A | 9/1988 | Williams |
| 5,224,254 A * | 7/1993 | McPeak et al. ............... 29/261 |
| 5,233,740 A * | 8/1993 | Chen ............................. 29/252 |
| 5,419,027 A * | 5/1995 | McPeak et al. ............... 29/252 |
| 5,836,633 A | 11/1998 | Svensson |
| 6,609,283 B1 * | 8/2003 | Somerville .................... 29/262 |
| 6,983,522 B2 | 1/2006 | Weller et al. |
| 2007/0187966 A1 * | 8/2007 | Hetschel ....................... 294/88 |

FOREIGN PATENT DOCUMENTS

| DE | 1 703 579 U | 7/1955 |
|---|---|---|
| DE | 79 05 218 U1 | 6/1979 |
| DE | 28 31 140 A1 | 1/1980 |
| DE | 41 22 806 A1 | 1/1993 |
| DE | 44 00 354 A1 | 7/1995 |
| DE | 195 07 676 A1 | 10/1995 |
| DE | 198 12 958 A1 | 9/1999 |
| DE | 101 38 343 A1 | 2/2003 |
| EP | 1 238 751 A2 | 9/2002 |

* cited by examiner

Primary Examiner—Lee D Wilson
(74) Attorney, Agent, or Firm—Akerman Senterfitt

(57) ABSTRACT

A replacement device for clamping heads comprises a plurality of clamping jaws and is provided with pivoting parts, which are pivotably mounted on a carrier. The pivoting parts extend essentially in the axial direction of the device and can engage in holes on the clamping jaws. A radially active force applying device pushes the pivoting parts outwards, causing the clamping jaws connected thereto to be pressed together. In this way, the clamping head can be used in a housing or a machine-tool.

20 Claims, 3 Drawing Sheets

REPLACEMENT DEVICE FOR CLAMPING HEADS COMPRISING A PLURALITY OF CLAMPING JAWS

FIELD OF APPLICATION AND PRIOR ART

The invention relates to a replacement or changing device for clamping heads having several clamping jaws.

DE 283 1140 A discloses a clamping jaw comprising a clamping head and a body. Such clamping jaws are characterized in that they can be very rapidly re-tooled. The body and clamping head are connected by a coupling. The clamping head comprises several clamping jaws linked by an elastomer. As a result of the elastomer, at least in the vicinity of the coupling, the clamping head can be compressed for connecting and disconnecting the coupling.

The coupling between the body and the clamping head is usually formed by a radial projection. The connection and disconnection of the connecting coupling takes place through radial compression of the individual clamping jaws of the clamping head or by a tilting movement of the individual clamping jaws leading to disengagement of the radial coupling. For releasing the coupling use is made of a tool, which engages in axial recesses on the front face of the segments of the clamping head, such as is also described in DE 283 1140 A. This type of operation suffers from the disadvantage that it is not in accordance with the force distribution. If the elastomer between the clamping jaws of the clamping head is compressed, there is a superproportional increase in the force necessary for this, so that at the end of the process a great detail of force must be applied by an operator.

This problem can be solved by the use of a gear system which is in accordance with this force distribution. De 10138343 A1 describes such a device, which is operated by a lever mechanism. Hydraulically or pneumatically operated devices are also known. It is common to all the known devices that they have pivoting parts, whose number is matched to the number of clamping jaws of the clamping head. These pivoting parts are directed radially and are mounted in tangentially directed shafts. The operating force necessary for pivoting purposes is initiated by a central tie bolt.

As a result of the arrangement of the pivoting parts, the known replacement tools have very large radial dimensions and are usually much larger than the clamping head to be replaced. This makes difficult a use in machines having tools arranged around the machining spindles or where the spindles are closely juxtaposed. It is also necessary in some applications to as far as possible support the workpiece to be machined or to keep its extension length as small as possible. For this purpose the clamping head is constructed with an extended projecting part. This projecting part necessary for support purposes extends from the front face of the clamping head. The projecting part usually has a small diameter, so that there is an adequate collision free space for the tools required for machining. In such cases the clamping head can no longer be changed with the known changing devices, because the central arrangement of the tie bolt and the radial extension of the pivoting parts prevent a joining of the clamping head. In order to still enable replacement to take place, the pins necessary for operation are made extremely long. However, this unfavourably changes the leverage, so that the operating force increases enormously and can scarcely be manually provided.

PROBLEM AND SOLUTION

The problem of the invention is to provide a replacement device of the aforementioned type making it possible to avoid the problems of the prior art and in particular enabling the replacement of clamping heads with a projecting part, whilst simultaneously using little force, whilst also significantly reducing the radial construction space.

This problem is solved by a replacement device having the features of claim 1. Advantageous and preferred developments of the invention form the subject matter of further claims and are explained in greater detail hereinafter. By express reference the wording of the claims is made into part of the content of the description.

The replacement or changing device has a carrier, which extends radially from a central axis, particularly a median longitudinal axis, of the replacement device with outer areas so as to project from the central axis. A bearing is provided for one pivoting part per clamping jaw at the outer areas or ends or carrier plates fixed thereto. The pivoting part has at least one and in certain circumstances two extending sections cooperating with a clamping jaw. With such a cooperation, which can for example be brought about by engagement in the clamping jaw, a radial force and a torque can be transmitted. If the pivoting part is pivoted about the bearing, the extending portions also pivot and radially are drawn closer together, particularly at their ends. Therefore, in per se known manner, they press together the clamping jaws, particularly at the remote end, in order to produce or release the aforementioned coupling. According to the invention for pivoting the pivoting parts a force application device is provided, whose action direction is substantially radial, it acting on a point on the pivoting parts for pivoting purposes having an axial spacing from the bearing and to the extending portions. In particular, the force application device can act substantially radially outwards.

Thus, other than in the prior art, the pivoting parts can at least partly and advantageously largely run in the axial direction. Radially within the bearing for the pivoting parts can be formed a free space, into which can for example project a projecting part of a clamping head. As a result the lever length or leverage by which the force application device acts on the pivoting parts, can be chosen independently of the radial extension.

The force application part acting on the pivoting parts can, according to a development of the invention, have a lever system. This can in particular be a toggle lever system for an advantageous force distribution and a type of automatic locking. Thus, an essentially axially acting operating force can be converted into the force acting radially on the pivoting parts. The replacement device can have a lever carrier, which is axially movable relative to the carrier or the two parts are movable relative to one another. There is at least one lever per pivoting part on the lever carrier and is operatively connected to the pivoting part, for example is mounted in rotary manner by a screw coupling or the like. The lever is at an inclined angle to the radial direction or central axis. Advantageously it can slope in the same direction towards the pivoting part in which the lever carrier moves towards the carrier during the relative movement of the two parts. For example said angle can be approximately 30 to 60ø, preferably approximately 45ø. It is particularly advantageous if the ratio between the axial operating path and the radial operating path for the lever at the end of pivoting is at a maximum, because then the force ratio is also very large. The lever end angle is advantageously virtually 90ø.

If the lever carrier and carrier are moved relative to one another and in particular towards one another, as a result of its bearing both on the lever carrier and on the pivoting part, the lever is rotated radially in an ever shallower angle, so that it presses the pivoting parts outwards. This for example makes it possible for a type of self-locking to so-to-speak over-press the lever beyond the radial direction and it is locked in this position by the opposing force. This is then a typical toggle lever system.

In an alternative development of the invention the force application device can have a wedge or key gear. In this case part of the wedge gear is placed on a pivoting part and another part is placed on a wedge gear carrier, which is axially relatively movable with respect to the carrier. The parts of the wedge gear can cooperate in such a way that during the relative movement there is a pivoting of the pivoting parts. To the wedge gear carrier is for example fixed a conical part, which acts against correspondingly cooperating opposing parts on the pivoting parts, particularly with a corresponding bevel, the taper of the cone being in the direction of the relative movement between carrier and wedge gear carrier. During the relative movement the cone presses apart the pivoting parts.

Advantageously the pivoting parts are substantially axially directed, i.e. directed parallel to the central axis. This permits a radially relatively confined arrangement. It makes it possible to construct the replacement device somewhat longer in the axial direction so that in the case of a limited radial extension an adequate leverage can be exerted on the extending portions and therefore the clamping jaws.

An application point of the force application device on the pivoting parts can have roughly the same radial spacing from the central axis as the bearing of the pivoting parts on the carrier. Alternatively said point can be displaced radially inwards or radially outwards. Moreover, in conjunction with the radial acting force application device or the force distribution produced by it the pivoting characteristics of the pivoting parts can be adjusted or positively influenced in a desired manner. Thus, it is possible for said high force to be reached precisely at the end of the pivoting of the pivoting parts, when the force to be applied to the clamping jaws is at a maximum.

It is also possible within the scope of the invention to construct the pivoting parts with a radially inwardly directed bend on which the force application device acts. This can also influence the force distribution.

To achieve very low operating forces in the case of minimum construction sizes, the bearing of a pivoting part on the carrier or a carrier plate fixed thereto can be located at an axial end region of the pivoting part. An application point of the force application device on the pivoting part can be axially far removed therefrom, in particular roughly at the other end region.

The carrier and bearing of the pivoting parts are advantageously located on those sides of the replacement device which are directed towards the clamping head. This makes it possible to displace the fulcrum of the pivoting parts, which is also the fulcrum of the clamping jaws, as close as possible towards the said clamping jaws. As a result the clamping jaws of the clamping head can be particularly advantageously compressed, namely particularly at the remote end, which is intended to engage in the coupling of the body or the machine tool.

As a function of the size of the replacement device, it can be advantageous if an extending portion runs in its longitudinal extension or the imaginary continuation of the longitudinal direction through the bearing of the pivoting parts on the carrier. This makes it possible to create a very large free inner space for clamping heads with a projecting part. However, this can be varied as a function of whether the replacement device is to be provided for clamping heads with a very large projecting part or with a minimum radial extension. The longitudinal extension can run past radially inside or outside.

The outer area of the carrier can be constructed as a projecting part. In particular, for this purpose the carrier can be constructed in one piece and in a roughly radial form. The outer area of the carrier can be constructed as a projecting arm, to whose sides are in each case fixed a carrier plate close to the end. These carrier plates are angular and can outwardly cover part of the replacement device. To these carrier plates are fixed bearing pins, advantageously roughly at right angles to the radial extension of the projecting arms of the carrier. A pivoting part can be mounted between two carrier plates. Through the fixed connection of the carrier plates to the carrier or its projecting arms, a fixed bearing for the pivoting parts on the carrier is obtained.

A pivoting part can for example be constructed in such a way that it has a U-section extending in its longitudinal direction and which is open towards the central axis of the replacement device. The at least one extending portion is fixed to the base, particularly to the inside of the U-section. Advantageously the extending portion extends over the entire length of the U-section as an integral part, for example as a cylindrical pin. Thus, the extending portion can essentially take over the force transmission between the force application device and the clamping jaw.

In particular, the extending portion should extend at least up to the area where the force application device acts on the pivoting part, which particularly adequately permits force transmission. It is possible for the force application device to act directly on the extending portion.

To produce the relative movement between carrier and a further carrier on which the force application device acts, particularly the aforementioned lever carrier or wedge gear carrier, it is possible to link the two carriers by means of a guide pin or force transmission pin running along the central axis. One of the two carriers is firmly connected to the pin, whereas the other is mounted in axially movable manner thereon. Advantageously the guide pin is fixed to the carrier and projects over and beyond the force application device carrier, particularly away from the clamping head. Thus, an operating device can so-to-speak easily engage on the carrier, for example in that it engages both on the force application device carrier and on the guide pin extending over and beyond the same and brings about a relative movement between the two, for operating the replacement device. For this purpose the guide pin can be terminally provided with a thread onto which is screwed a corresponding thread on the operating device. On further screwing thereon, it presses against the carrier of the force application device and consequently brings about a relative movement of both parts. Alternatively lever systems or the like can be used, such as are in particular known from DE 101 38 343 A.

These and further features can be gathered from the claims, description and drawings and individual features, both singly or in the form of subcombinations, can be implemented in an embodiment of the invention and in other fields and can represent advantageous, independently protectable constructions for which protection is claimed here. The subdivision of the application into individual sections and the subheadings in no way restrict the general validity of the statements made thereunder.

BRIEF DESCRIPTION OF THE DRAWINGS

Embodiments of the invention are described in greater detail hereinafter relative to the attached drawings, wherein show.

DETAILED DESCRIPTION OF THE EMBODIMENTS

Figure 1:
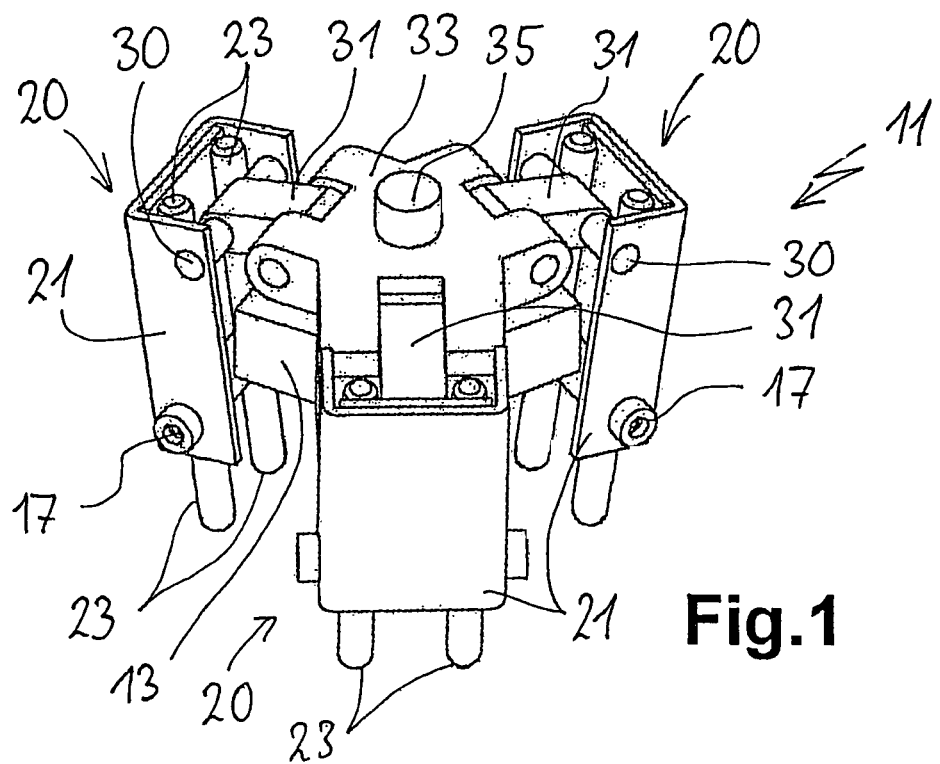
FIG. 1 A partial representation of an inventive replacement device with a view of the interior.

FIG. 1 shows a replacement or changing device 11 according to the invention. This is constructed for a clamping head having three clamping jaws, as becomes clear from the representation in FIGS. 3 to 5. To a carrier 13 having three projecting arms are fixed to the sides of said arms carrier plates 15, for example by welding or screwing. The carrier plates 15 are in each case provided between two adjacent arms of carrier 13, as is more particularly shown in FIG. 3.

On the carrier plates 15 are provided pivot bearings 17. In a simple case these are formed by holes in the carrier plate 15, into which engage projecting shafts or the like. On the pivot bearings 17 are mounted pivoting parts 20 comprising an elongated U-section 21, which is open towards the centre or the central axis shown in broken line form in FIG. 2. In the U-sections 21 of pivoting parts 20 are in each case inserted two rods 23 as extending portions and are advantageously fixed therein. They clearly project downwards beyond the U-sections 21 for engagement in the clamping jaws of the chuck. The fixing of the rods 23 to the pivot bearings 17 or the construction of this arrangement can be readily carried out by the expert. At the other end of the pivoting parts 20 is in each case provided a lever bearing, particularly as a through shaft or the like. A lever 31 is arranged in articulated manner thereon. In turn it is placed in articulated manner on a lever carrier 33, whose outer contour is similar to carrier 13. Like the latter it has three arms, a lever 31 being mounted on each arm.

A guide pin 35 is fixed or integrally constructed on carrier 13 and projects through a corresponding opening in lever carrier 33 and projects somewhat beyond the same. This projecting length can differ as a function of the construction and further reference will be made thereto hereinafter.

Figure 2:
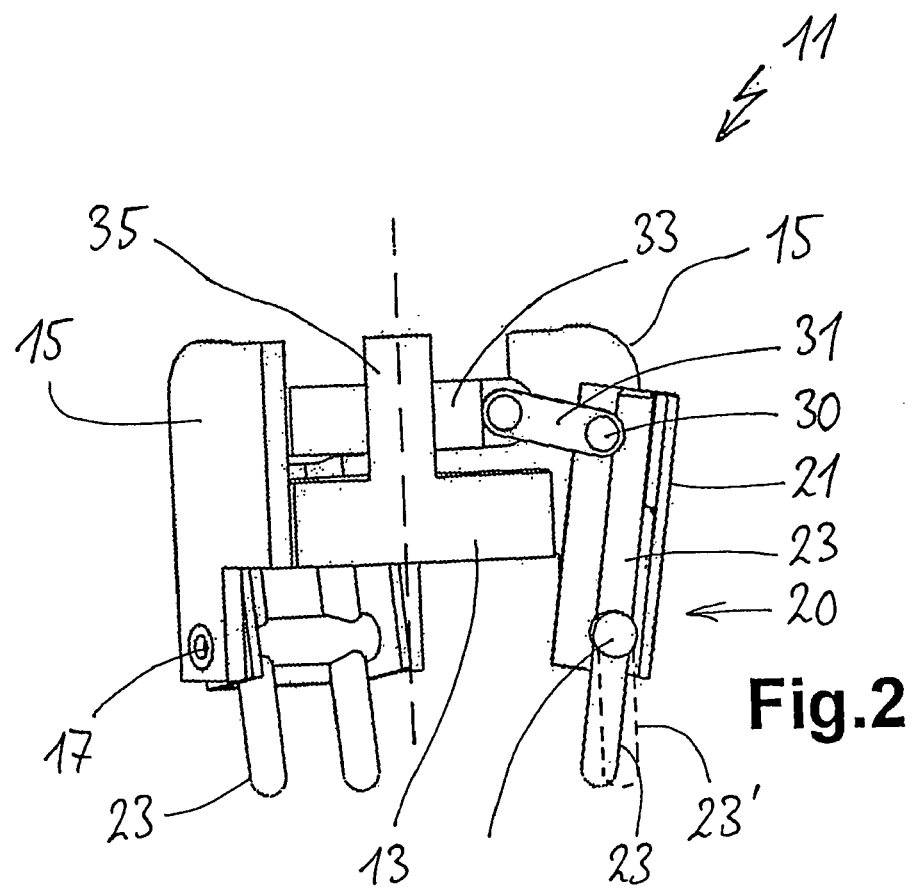
FIG. 2 A lateral partial section through the replacement device of FIG. 1.

FIG. 2 shows the pivoting parts 20 in an at least partly pivoted position. The original, unoperated position 23' in which the rods 23 are roughly parallel to the central axis is shown in broken line form.

Figure 3:
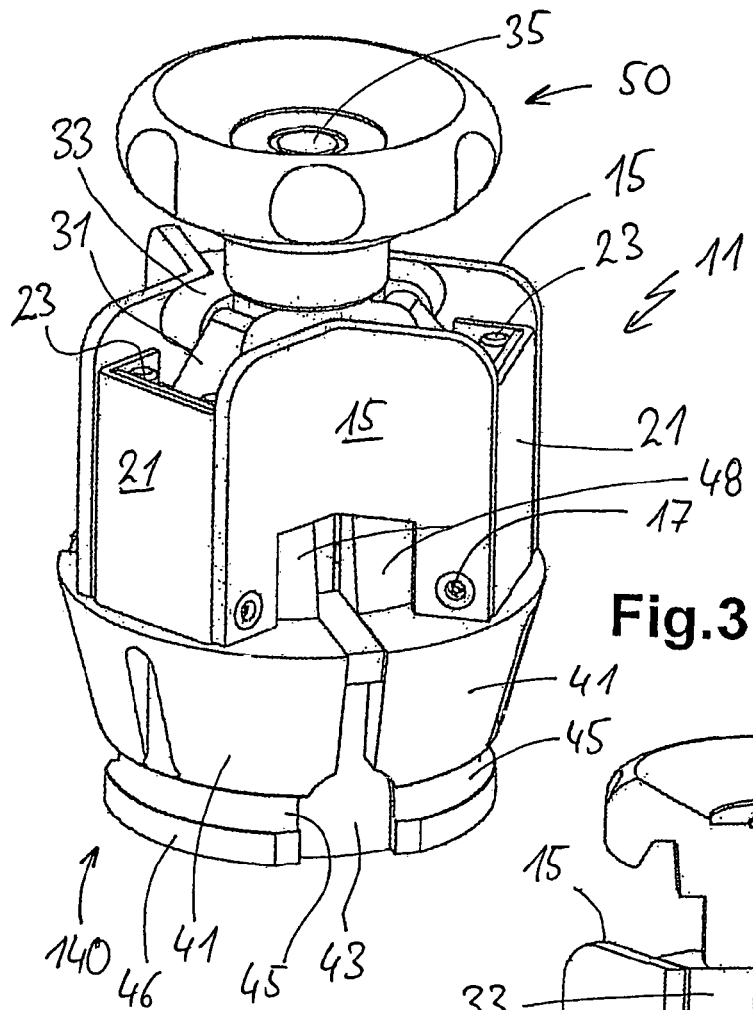
FIG. 3 An outside view of a complete inventive replacement device on a clamping head in the unoperated position.

FIG. 3 shows a finished replacement device 11 in the unoperated state and is attached to a clamping head 40. The latter is essentially constructed like a conventional clamping head, as described hereinbefore. It has three clamping jaws 41, having in each case two front face holes 42. Clamping jaws 41 are connected to rubber joints 43, as is also known from the prior art. In the lower area the clamping jaws 41 have a circumferential groove 45 beneath which there is a circumferential projection 46. Thus, the clamping jaws 41 or the clamping head 40 engage in the corresponding coupling of a tie rod or the like in a body or machine tool. It can also be seen that projecting parts 48 are constructed on the clamping head 40 radially inside the front face holes 42.

In FIG. 3, compared with FIG. 2, it can be gathered that the spacing between carrier 13 and lever carrier 31 is relatively large in the unoperated state.

Figure 4:
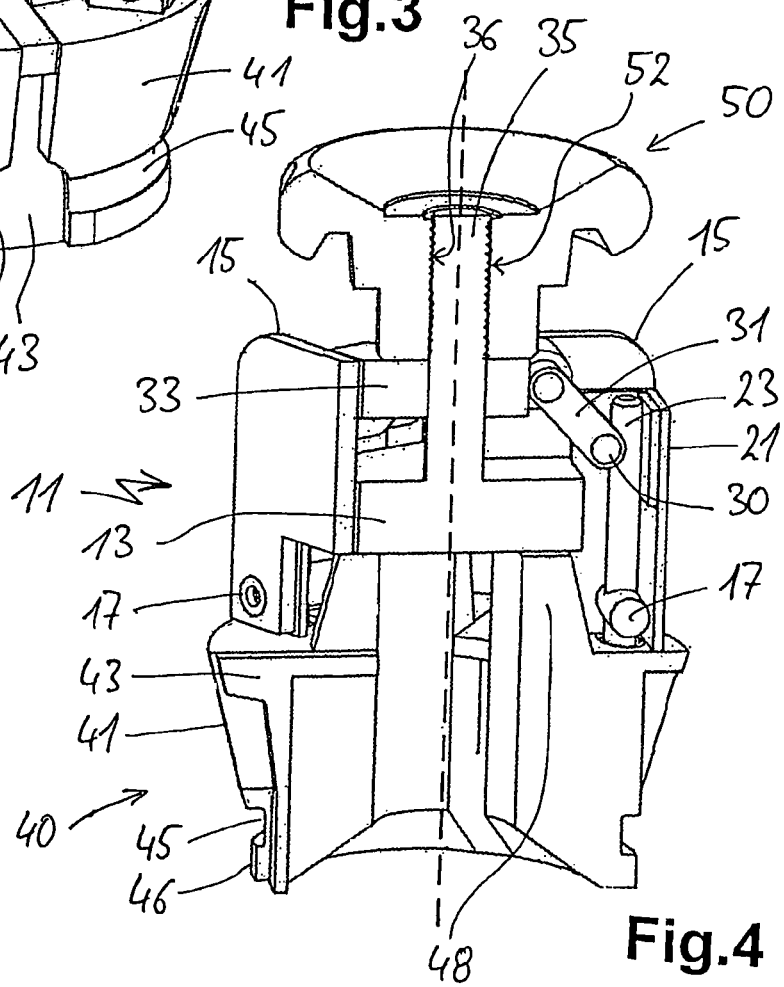
FIG. 4 A lateral partial section through the arrangement of FIG. 3.

From the partial section of FIG. 4 in the unoperated or starting state, it can be seen that here the rods 23 are parallel to the central axis shown in broken line form. The levers 31 project roughly in an angle of 45ø to the radial direction and therefore also to the central axis. As a result of the set back carrier 13 and the relatively widely outwardly positioned pivoting parts 20 or U-sections 21 and rods 23, a large clearance is obtained, where there is adequate space for the projecting part 48 of clamping head 40. The angled carrier plates 15 can be used for twisting-resistant guidance of the lever carrier 33 during relative movement with respect to carrier 13.

In this construction the guide rod 35 can have an external thread 36, on which is mounted a handwheel 50 having an internal thread 52 matching the external thread 36. The underside of handwheel 50 engages on lever carrier 33.

Figure 5:
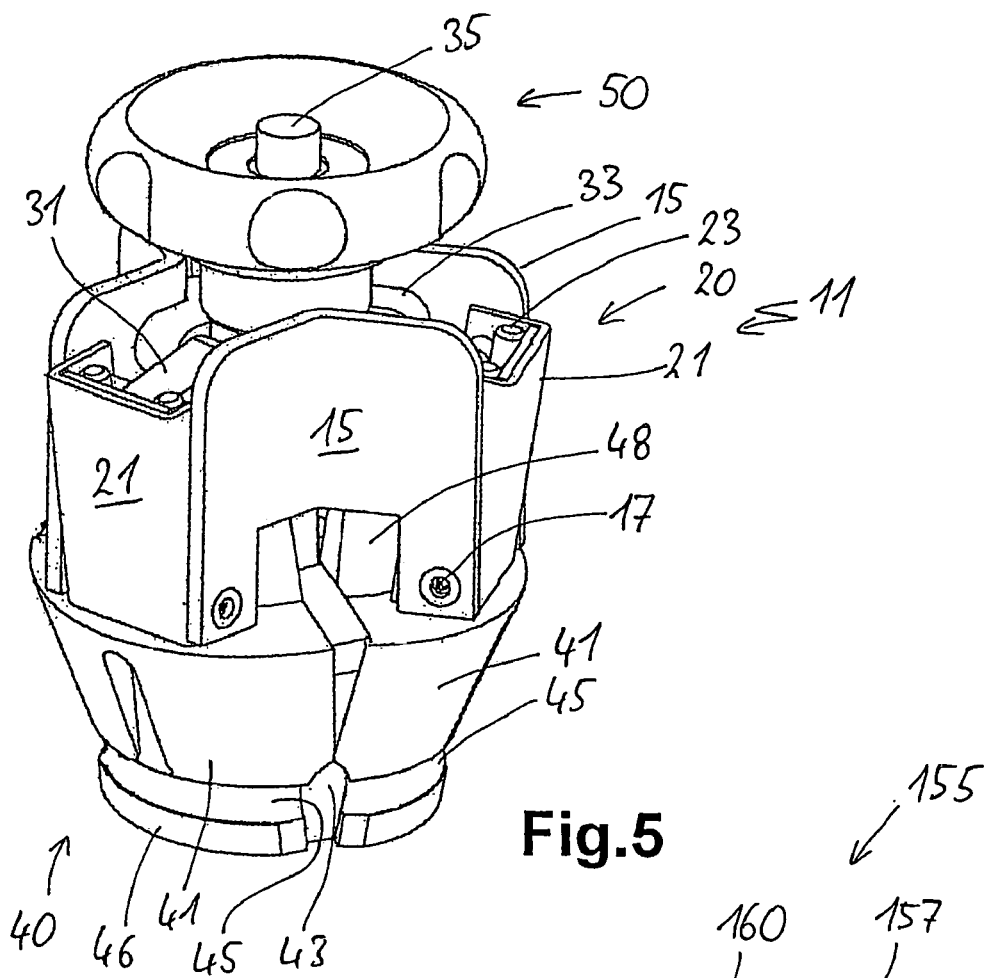
FIG. 5 The arrangement according to FIG. 3 in the operated state with compressed clamping head.

FIG. 5 shows how the handwheel 50 is screwed onto the guide pin 35, where it presses the lever carrier 33 against carrier 13. This leads to the change apparent from comparing FIGS. 4 and 2. Lever 31 is pivoted or drawn up and presses pivoting part 20 radially outwards. The latter pivots about pivot bearing 17, so that the rods 23 projecting over U-section 21 or pivot bearing 17 are rotated radially inwards with the end thereof. In the maximum pivoted position shown in FIG. 5, lever carrier 33 can be moved still further towards the carrier 13. The point at which the levers 31 are mounted on the lever carrier 33 can axially move past the lever bearing 30. It is axially closer to carrier 13. This corresponds to the toggle lever principle, in which the toggle lever arrangement is so-to-speak overpressed and comes into a stable position. No further force then has to be applied by the operating device.

Alternatively to the bearing of rods 23 shown in FIG. 2 and which is precisely at the height of pivot bearing 17, it is possible for the rods 23 to run past the same radially inwards or radially outwards. The attainable advantages can be of a differing nature. For example, the pivoting movement of rods 23 from the broken line position 23' shown in FIG. 2 can be influenced.

Figure 6:
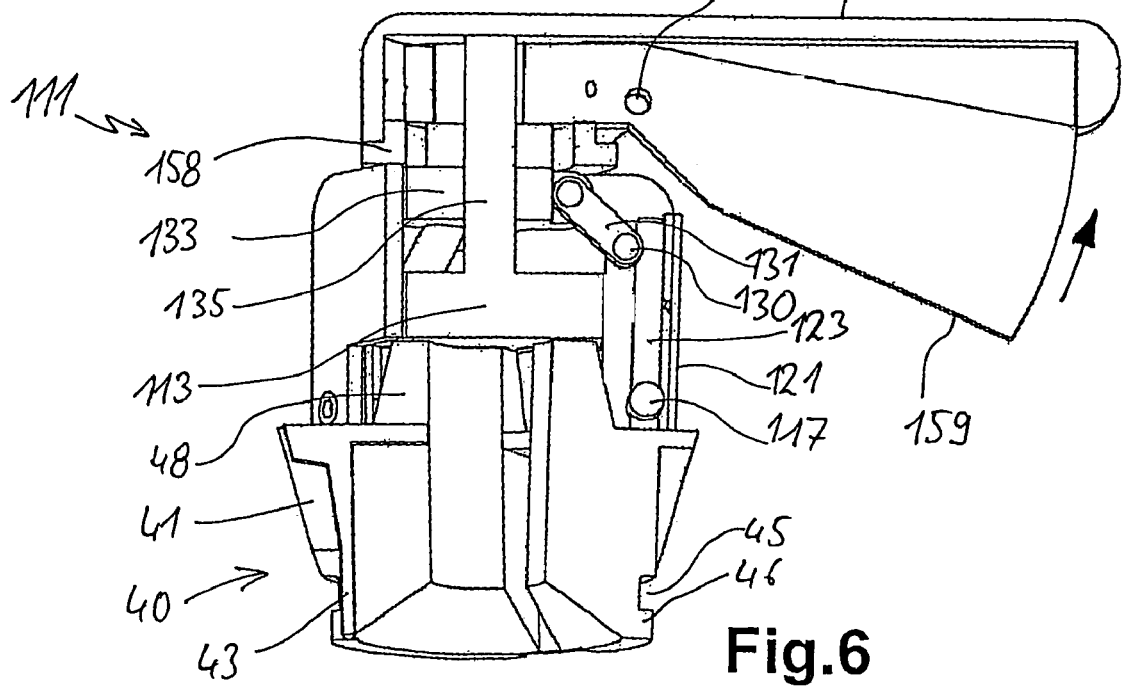
FIG. 6 An alternative construction of an operating device for an inventive replacement device in a lateral partial section.

FIG. 6 shows a further replacement device 111, which is attached to a known clamping head 40. With the exception of the operating device, the replacement device 111 is constructed in a substantially identical manner to what has been described hereinbefore. The operating device is here a folding grip 155, which has a gripping tray 157 provided with an attachment 158. Attachment 158 engages on the top of carrier plates 115. A folding part 159 is pivotably mounted on a bearing 160.

Guide pin 135 projecting from carrier 113 is connected to the gripping tray 157 and passes through a correspondingly large recess in folding part 159. With the portion to the left of bearing 160, folding part 159 is applied to the top of lever carrier 133. If folding part 159 is pressed counterclockwise against the gripping tray 157, then the latter, via guide pin 135 retains the carrier 113 whereas the lever carrier 133 is pressed downwards and against the same. Thus, once again the aforementioned rotation of lever 131 takes place and consequently a pivoting of pivoting parts 120 for compressing the clamping jaws 41 of clamping head 40.

The invention claimed is:

1. A replacement device for clamping heads having several clamping jaws, wherein said clamping jaws are separated from one another by radially directed slits and are elastically interconnected, said replacement device comprising:

a carrier with outer areas, which extend from a central axis of said replacement device in a radial direction, each outer area having a bearing for one pivoting part for each of said clamping jaws, each said pivoting part having at least one extending portion for radial force and torque-transmitting cooperation with said clamping jaws; and a radially acting force application device for acting on said pivoting parts for pivoting said pivoting parts with a certain axial spacing from said bearing and said extending portions, wherein on pivoting said pivoting part said extending portions are substantially radially further compressed by pivoting about said bearing as a result of said cooperation, wherein one of said pivoting parts is pivoted on a carrier plate that is fixed to said carrier, and wherein an outer area of said carrier is constructed as a projecting arm, wherein on the sides of said arm, close to an end, is fixed in each case one said carrier plate for said pivoting parts, said carrier plates having two parts being angled towards each other.

2. The replacement device according to claim 1, wherein said force application device has a lever system for transforming a substantially axially acting operating force into a radial force acting on said pivoting parts.

3. The replacement device according to claim 2, wherein said lever system is a toggle lever system.

4. The replacement device according to claim 3, wherein a lever carrier is provided being axially movable relative to said carrier, wherein on said lever carrier there is provided one lever for each of said pivoting parts, wherein said lever is in each case operatively connected to said pivoting part and is arranged at an inclined angle to said radial direction pointing in sloping manner towards said pivoting part roughly parallel to a moving direction of said lever carrier being movable relative to said carrier for pivoting said pivoting parts.

5. The replacement device according to claim 4, wherein said lever is rotatably mounted on said pivoting part.

6. The replacement device according to claim 5, wherein in an initial position prior to pivoting, said lever is at an angle of approximately 30° to 60° to said central axis.

7. The replacement device according to claim 5, wherein in an end position after pivoting, said lever is at an angle of approximately 90° to said central axis.

8. The replacement device according to claim 1, wherein said force application device has a wedge gear, wherein one part of said wedge gear is located on a pivoting part and another part of said wedge gear is located on a wedge gear carrier, said wedge gear carrier being movable axially relative to said carrier, and wherein by an axial relative movement between said carrier and said wedge gear carrier, said wedge gear brings about a pivoting of said pivoting parts.

9. The replacement device according to claim 1, wherein an application point of said force application device on said pivoting parts has roughly the same radial spacing from said central axis as the spacing of said bearing from said pivoting parts.

10. The replacement device according to claim 1, wherein there are two said carrier plates per said pivoting part, said carrier plates being fitted externally to said replacement device.

11. The replacement device according to claim 1, wherein one said carrier plate passes between two said bearings which are arranged adjacently.

12. The replacement device according to claim 1, wherein said bearing of said pivoting part on said carrier is provided on an axial end region of said pivoting part, and wherein an application point of said force application device is roughly at the other end region.

13. The replacement device according to claim 1, wherein said carrier and said bearing of said pivoting parts are located on a side of said replacement device being directed towards said clamping head.

14. The replacement device according to claim 1, wherein a guide pin running along said central axis is fixed to one of said two carriers and is at least axially movably mounted on the other of said two carriers, wherein said carrier and a further carrier, on which said force application device is acting or which is part of said force application device, are interconnected via said guide pin.

15. The replacement device according to claim 14, wherein said guide pin is fixed to said carrier and projects over and beyond said carrier of said force application device.

16. The replacement device according to claim 15, wherein an operating device acts on said carrier of said force application device and on said guide pin in order to bring about a relative movement between said carrier and said guide pin for operating said replacement device.

17. A replacement device for clamping heads having several clamping jaws, wherein said clamping jaws are separated from one another by radially directed slits and are elastically interconnected, said replacement device having:

a carrier with outer areas, which extend from a central axis of said replacement device in a radial direction and each have a bearing for one pivoting part per one of said clamping jaws, said pivoting part having at least one extending portion for radial force and torque-transmitting cooperation with said clamping jaws, wherein on pivoting said pivoting part said extending portions are substantially radially further compressed by pivoting about said bearing as a result of said cooperation, wherein a radially acting force application device is provided for acting on said pivoting parts for pivoting said pivoting parts with a certain axial spacing from said bearing and said extending portions, wherein said extending portion passes radially through said bearing of said pivoting parts on said carrier, and wherein said pivoting part has an axially extending U-section which is open towards said central axis of said replacement device.

18. The replacement device according to claim 17, wherein on the base of said U-section is fixed at least one said extending portion and said extending portion extends up to a region where said force application device is applied to said pivoting part.

19. The replacement device according to claim 18, wherein said force application device is constructed for acting on said extending portion.

20. The replacement device according to claim 19, wherein at least one said extending portion passes over and beyond the length of said pivoting part.

* * * * *